United States Patent
Galasso et al.

[15] 3,640,693
[45] Feb. 8, 1972

[54] METHOD OF FORMING SILICON COMPOUND FIBERS

[72] Inventors: Francis S. Galasso, Manchester; Richard D. Veltri, East Hartford, both of Conn.

[73] Assignee: United Aircraft Corporation, East Hartford, Conn.

[22] Filed: Feb. 3, 1969

[21] Appl. No.: 795,783

[52] U.S. Cl. ............................65/2, 23/191, 23/204, 23/208, 29/419, 65/13
[51] Int. Cl. .........................................C03b 37/00
[58] Field of Search .................65/6, 13, 32, 2; 29/419; 23/191, 209 R, 208 A, 204, 208; 117/129

[56] References Cited

UNITED STATES PATENTS

| | | | |
|---|---|---|---|
| 3,352,637 | 11/1967 | Heymer et al. | 23/191 |
| 3,362,803 | 1/1968 | Dannohl et al. | 65/13 |
| 3,368,871 | 2/1968 | O'Connor et al. | 23/208 A |
| 3,413,707 | 12/1968 | Klein et al. | 29/419 |
| 3,455,745 | 7/1969 | Kern et al. | 29/204 |
| 3,483,072 | 12/1969 | Cox et al. | 65/13 |

Primary Examiner—S. Leon Bashore
Assistant Examiner—Robert L. Lindsay
Attorney—John D. Del Ponti

[57] ABSTRACT

A process for producing low-density high-modulus fibers including the steps of inserting silicon metal, preferably in powdered form, in a glass tube to form a composite, vacuum casting to melt the silicon metal in the tube, drawing the resulting glass-silicon composite rod into a fiber having a filamentary silicon core and an outer glass sheath, removing the glass sheath and contacting the exposed silicon core with a suitable reactant to form a silicon compound fiber.

8 Claims, 2 Drawing Figures

PATENTED FEB 8 1972          3,640,693
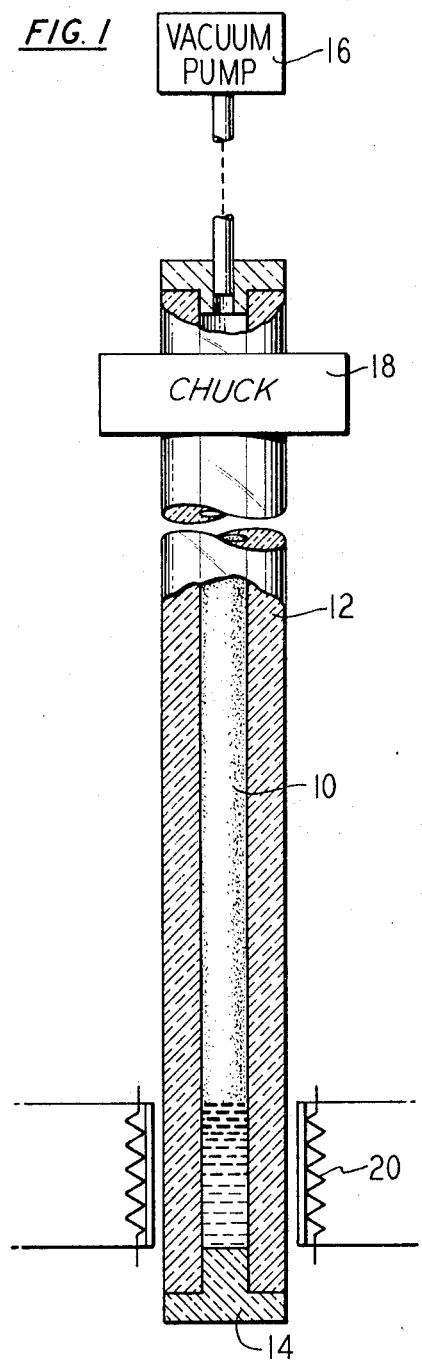
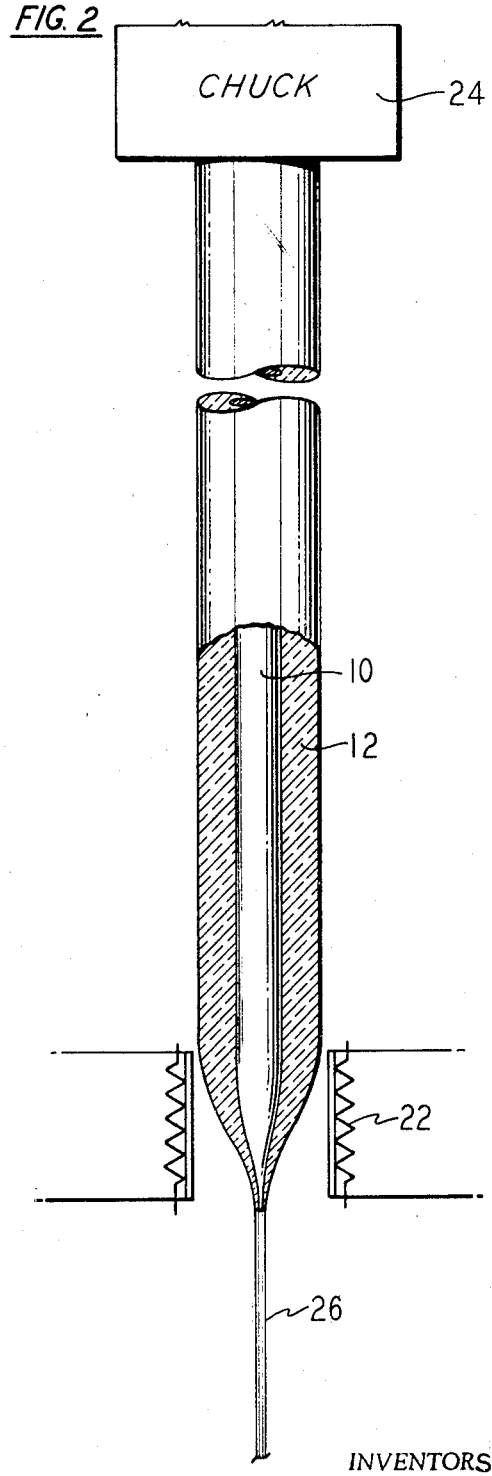
INVENTORS
FRANCIS S. GALASSO
RICHARD D. VELTRI
BY  John D. Del Ponti
ATTORNEY

1

METHOD OF FORMING SILICON COMPOUND FIBERS

BACKGROUND OF THE INVENTION

This invention relates to the production of low-density high-modulus fibers and more particularly relates to a method of forming silicon compound fibers characterized by the absence of a foreign metal core.

In recent years considerable effort has been expended in the preparation of low-density high-modulus fibers for use in lightweight composite structures. In particular, fibers of boron, and fibers of silicon carbide, as well as fibers of silicon carbide coated boron, have demonstrated the potential of fulfilling the stringent needs of aerospace application. The production of these fibers is carried out, in general, by a process wherein a suitable gas is pyrolytically decomposed on a heated filamentary tungsten core with the deposit being built up to the desired thickness. One of the major drawbacks in such a process resides in the fact that with an alien metal substrate, such as tungsten, whose density is high relative to the material being deposited, the fibers produced have an effectively higher resultant density by virtue of its presence. It, of course, would be advantageous to minimize fiber density by replacing or doing away with the tungsten core, particularly in aerospace application where weight savings result directly in increased payload, but until now this could not effectively be done without jeopardizing desirable fiber properties. In addition, the cost of a tungsten core process as the one above described appears almost prohibitive particularly when compared to the potential savings of the instant invention. Not only is the rate of fiber formation relatively slow in a pyrolytic deposition process, but the tungsten needed is available only at substantial and high costs.

SUMMARY OF THE INVENTION

In the instant invention, there is disclosed a method of forming low-density, high-modulus silicon compound fibers without the necessity of utilizing a foreign metal core. The method includes the production of such fibers as silicon carbide, silicon nitride and boron silicide by the chemical transformation silicon filament.

According to one aspect of the invention, there is provided a method of consistently reproducing, on a continuous basis, low-density, high-modulus silicon compound fibers amenable to usage as reinforcement materials. There is provided a process for the production of silicon compound fibers by casting silicon metal as the core of a glass-metal composite rod while inhibiting reaction between the silicon core and its outer glass shell, drawing the composite rod into a composite fiber, removing the shell from the fiber, and contacting the exposed silicon core with appropriate materials under reaction conditions as desired.

The process includes the vacuum casting of the silicon in a pretreatment technique according to a predetermined heating schedule prior to the fiberization of the composite rod.

BRIEF DESCRIPTION OF THE DRAWINGS

An understanding of the invention will become more apparent to those skilled in the art by reference to the following detailed description when viewed in light of the accompanying drawings, wherein:

FIG. 1 is an elevational view, partly in section, of the composite rod and associated apparatus illustrative of the pretreatment step of the inventive process; and FIG. 2 is an elevational view, partly in section, of the composite rod and associated apparatus illustrative of the fiberizing step of the inventive process.

DESCRIPTION OF THE PREFERRED EMBODIMENTS

Referring now to the drawings, wherein like numerals indicate like parts; commercially available silicon 10, usually in powder form, is inserted into a glass tube 12, preferably a capillary tube, and is pretreated in a manner to render the silicon amenable to subsequent fiberization. The composite rod is heated to the fiberization temperature of the glass tubing and is drawn by any suitable fiber drawing means (not shown) such as a rotating drum, to produce a glass-sheathed silicon composite fiber of the desired size. The glass sheath is then removed by passage of the composite through an etching solution of hydrofluoric acid and the exposed silicon filament is subjected to an appropriate gas under reaction conditions to form a silicon compound fiber.

In a preferred embodiment of the invention, the glass tubing 12 is closed at its lower end, such as by a plug 14, is filled with silicon powder 10 and is connected at its upper end to a vacuum pump 16. A feeder mechanism such as a chuck 18 is provided to continuously feed the composite rod to a furnace 20 at a predetermined rate in order to vacuum cast the silicon core within the glass tube. It is to be understood that the vacuum casting of the silicon is a pretreatment step which is carried out without causing a disturbance to the glass.

During experimentation, it was found that silicon powder does not melt uniformly during the drawing of the composite and that pretreatment thereof is necessary to the formation of a satisfactory silicon fiber. In order to produce acceptable silicon filaments, it was further determined that a vacuum casting of the silicon within the glass tubing had to be made prior to the fiberization of the composite. The precise conditions under which the silicon is to be cast depends, to some extent, on the type of glass selected for use as the tubing 12. The glass tube can be of any conventional fiber-forming glass composition having a fiberizing temperature above the melting point of silicon (1,410° C.) but below that temperature at which the silicon reacts with its glass host. Pyrex composition glasses with a drawing temperature around 1,200° C. were found unsuitable since that temperature is too low to allow melting of the silicon prior to composite fiberization. Additionally pure silica glass was found unsuitable since its drawing temperature of 2,000° C. is too high and results in reaction with the silicon.

After due investigation, it was found that a glass such as the Owens Corning Glass Co. glass sold under the name "Vycor" and having a 96 percent silica content and a drawing temperature of about 1,850° C. was most compatible with both silicon pretreatment and composite drawing. Accordingly, Vycor glass capillary tubing 12 having an outside diameter ranging from 6 to 9 mm. and an inside diameter ranging from 3 to 5 mm. was used during tests. During pretreatment, the vacuum pump 16 was utilized to reduce and maintain the core pressure at $10^{-4}$ torr. The silicon was vacuum cast by passing the composite rod through a hot zone produced by the heater 22. It was determined that passage through a hot zone maintained at 1,550° C. at a rate of 30 cm./hour gave best results. Zone melting at a faster rate, for example at 40 cm./hour, fails to produce a uniform casting while zone melting at a slower rate, for example at 20 cm./hour, results in a Vycor-silicon reaction. The zone melting range was thus established as being at approximately 25–35 cm./hour, and preferably at 30 cm./hour through a zone heated to 1,550° C.

Following the vacuum casting of the silicon core, the glass-silicon composite is heated to the fiberization temperature of the glass tubing 12. As indicated previously, this temperature is above the melting point of the silicon core 10 so that both the glass and the silicon will flow. As shown in FIG. 2, the composite is preferably lowered into a fiberizing furnace 22 by a feeding mechanism 24 such as a chuck, located vertically above the furnace. When the fiberizing process is initiated, the plug 14 is removed and the lower end of the glass tubing 12 is closed by heating. There is thus produced a length of glass only before the production of the glass-silicon fiber.

The furnace 22, as well as the furnace 20, can be of any type, such as an open or partially closed induction furnace as long as it achieves the desired heating levels and contains an open portion through which the glass-silicon composite can be passed. The temperature range to which the composite is heated in furnace 22 depends of course on the fiberization temperature of the particular glass tubing being utilized in the process. This temperature range must be high enough to permit composite drawing but again must be low enough to prevent glass-silicon reaction. With the preferred Vycor glass tubing, the useful fiberization range at which satisfactory composite filaments can be drawn has been determined to be from 1,865° to 1,890° C.

After the proper fiberization temperature of the glass shell 12 is achieved, the composite is drawn by conventional means such as a drawing drum (not shown) to form a continuous glass fiber 26 containing a core of filamentary silicon. The speed at which the drawing step is carried out can be varied to produce composite fibers of varying sizes. Of course, the final diameter of the fibers depends not only on the drawing speed but also on the viscosity of the melt and the initial size of the composite. In general, drawing speeds of about 50 to 500 feet per minute are used to produce a composite fiber whose silicon core has a diameter of from 1 to 4 mils.

Following the attenuation of the composite by drawing, the glass sheath is suitably removed by passing the fiber through a normal HF etching solution (60 percent concentration) to expose the silicon core filament. The silicon filament is then passed through a reaction chamber such as for example the chamber shown in the copending application Ser. No. 618,512 filed by Basche et al. on Feb. 24, 1967 which shares a common assignee with the instant invention. The fiber is exposed to a reactant gas in the chamber which transforms the silicon to a silicon compound. In a preferred embodiment, the silicon filament is heated in a carbon containing gas such as methane at atmospheric pressure in a temperature range of 1,200°–1,410° C. to accomplish conversion to silicon carbide. Other reactants can be used to produce other silicon compounds. Ammonia or boron trichloride, for example, can be used to produce fibers of silicon nitride ($Si_3N_4$) and boron silicide ($B_4Si$) respectively.

The degree of conversion of the fiber from silicon to silicon compound will of course be influenced by the thickness of the silicon starting filament. Most of the silicon compound filaments produced to date have been homogeneous, that it totally converted, with a small remainder being only substantially converted. It should be noted, however, that even if total conversion is not achieved, the remaining core of unreacted silicon is not disadvantageous since, from a weight standpoint, it is lighter than a foreign metal core such as tungsten.

Illustrative of the present invention, the following example is given:

A length of high temperature Vycor glass capillary tubing having a nominal diameter of 6 mils (I.D. of 3 mils and O.D. of 6 mils) was closed off at its lower end and filled with approximately 6 inches of silicon powder. The upper end of the tubing was then attached to a vacuum pump and evacuated to $10^{-4}$ torr. The glass-silicon composite was attached to a vertical feeding mechanism and positioned so that the closed lower end of the tube was in the hot zone of an open induction-heated furnace at a temperature of 1,550° C. The tube was passed through the hot zone at 30 cm./hour so that the silicon melted and then solidified to form a vacuum cast core.

The pump and plug were disengaged from the glass-case silicon composite and the composite was then attached to a second vertical feeding mechanism above a second open induction-heated furnace. The composite was positioned so that its lower end was in the hot zone of the furnace at a temperature of 1,865°–1,890° C. When the outer glass tubing reached the furnace temperature, a fiber was drawn from its lower end at a speed of 300 feet per minute. The resulting composite fiber had a diameter of 5 mils.

The composite fiber was passed through a 60 percent solution of HF so that the glass sheath was etched away to expose a silicon core 2.5 mils in diameter.

The silicon filament was heated in methane at 1,400° C. at atmospheric pressure and was totally converted to silicon carbide. This was verified by X-ray diffraction analysis.

It can be seen that by the present invention a process has been discovered wherein silicon compound fibers are produced by continuously drawing filaments of silicon as the core of a glass-silicon composite fiber, removing the glass sheath and contacting the exposed silicon with the appropriate reactant. The unique method of manufacturing reinforcing fibers in accordance with the present invention provides an economical technique heretofore unknown.

What has been set forth above is intended primarily as exemplary to enable those skilled in the art in the practice of the invention and it should therefore be understood that, within the scope of the appended claims, the invention may be practiced in other ways than as specifically described.

What is claimed is:

1. A process for producing low-density, high-modulus silicon filaments comprising the steps of:
   inserting silicon metal in a glass tube to form a composite rod;
   vacuum casting to melt the silicon metal in said glass tube;
   heating the resulting composite rod to the fiberizing temperature of the glass tube;
   said fiberizing temperature being above the melting point of the silicon metal and said glass tube being substantially inert to said silicon metal at said fiberizing temperature;
   drawing the composite rod into a composite fiber comprising a filamentary core of silicon sheathed in a glass envelope; and
   removing said envelope to expose said silicon filament.

2. The process described in claim 1 wherein said silicon filament is contacted with a reactant to form a silicon compound fiber.

3. The process described in claim 2 wherein said reactant is methane and a silicon carbide fiber is formed.

4. The process described in claim 2 wherein said reactant is ammonia and a silicon nitride fiber is formed.

5. The process described in claim 2 wherein said reactant is boron trichloride and a boron silicide fiber is formed.

6. The process described in claim 1 wherein said vacuum casting is achieved by passing the composite rod through a hot zone of 1,550° C. at a speed of 30 cm./hour.

7. The process described in claim 1 wherein the fiberizing temperature of the glass is within a range of 1,865° to 1,890° C.

The process described in claim 7 wherein said glass tube has a silica content, by weight, of approximately 96 percent.

* * * * *